(12) United States Patent
Polloni

(10) Patent No.: US 6,390,317 B1
(45) Date of Patent: May 21, 2002

(54) MODULAR QUICK-FIT SYSTEM FOR ELECTRICAL DEVICES

(75) Inventor: Angelo Polloni, Ghedi (IT)

(73) Assignee: Palazzoli S.p.A., Brescia (IT)

( * ) Notice: Subject to any disclaimer, the term of this patent is extended or adjusted under 35 U.S.C. 154(b) by 0 days.

(21) Appl. No.: 09/561,947

(22) Filed: May 1, 2000

(30) Foreign Application Priority Data

Jun. 5, 1999 (IT) .......................................... MI99A0984

(51) Int. Cl.⁷ ................................................ B65D 6/00
(52) U.S. Cl. ....................... 220/3.8; 220/4.02; 220/23.4
(58) Field of Search ........................... 220/3.8, 3.7, 3.2, 220/4.02, 23.4

(56) References Cited

U.S. PATENT DOCUMENTS

| | | | | |
|---|---|---|---|---|
| 1,481,418 A | * | 1/1924 | Casper | ...................... 220/4.02 |
| 3,187,085 A | * | 6/1965 | Brackett | ................... 220/3.2 X |
| 3,897,883 A | | 8/1975 | Cederström | |
| 4,741,032 A | * | 4/1988 | Hampton | .................. 220/3.8 X |
| 5,344,009 A | * | 9/1994 | Choi | ...................... 220/23.4 X |
| 6,089,392 A | * | 7/2000 | Daoud | ...................... 220/3.8 X |

* cited by examiner

*Primary Examiner*—Steven Pollard
(74) *Attorney, Agent, or Firm*—R. Neil Sudol; Henry Coleman; William Sapone

(57) ABSTRACT

A modular quick-fit system for electrical devices includes a base plate, adapted to be anchored to a wall or any another support, and one or more electrical devices, each including a casing adapted to be associated with the base plate. The system includes a means for the temporary engagement of the casing with the plate, which allows to associate the body with the plate without using tools and to temporarily support the casing on the plate, and stable retainers adapted to permanently and detachably anchor the body to the plate.

9 Claims, 4 Drawing Sheets

MODULAR QUICK-FIT SYSTEM FOR ELECTRICAL DEVICES

BACKGROUND OF THE INVENTION

The present invention relates to a modular quick-fit system for electrical devices.

Electrical devices such as boxes, circuit breakers, outlets etc, are generally fitted to a wall by using a base plate which is screwed to the wall or any another support. The electrical devices are in turn associated with the plate by means of four screws arranged at the corners of the device.

Installers of these units always feel the need to achieve quicker and easier installation. The units are in fact currently fixed to the plate by means of at least eight screws for each device: four screws for fixing the bottom of the body of the device to the base plate and four more screws for fixing the cover of the device to the bottom.

SUMMARY OF THE INVENTION

The aim of the present invention is to provide a modular quick-fit system for electrical devices which allows quicker and easier installation of the devices with respect to the systems of the prior art.

Within the scope of this aim, an object of the present invention is to provide a modular quick-fit system for electrical devices which is economically advantageous.

Another object of the present invention is to provide a modular quick-fit system for electrical devices which is absolutely reliable.

This aim, these objects and others which will become apparent hereinafter are achieved by a modular quick-fit system for electrical devices, comprising a base plate adapted to be fixed to a wall or the like and one or more electrical devices, each comprising a casing adapted to be associated with said base plate, characterized in that it comprises a means for the temporary engagement of said body with said plate which allows to associate said casing with said plate without using tools and allows to temporarily support said casing on said plate, and a stable engagement means which is adapted to permanently and detachably anchor said casing to said plate.

BRIEF DESCRIPTION OF THE DRAWINGS

Further characteristics and advantages of the present invention will become apparent from the following detailed description of a preferred but not exclusive embodiment thereof, illustrated only by way of non-limitative example in the accompanying drawings, wherein.

DETAILED DESCRIPTION OF A PREFERRED EMBODIMENT OF THE INVENTION

Figure 1:
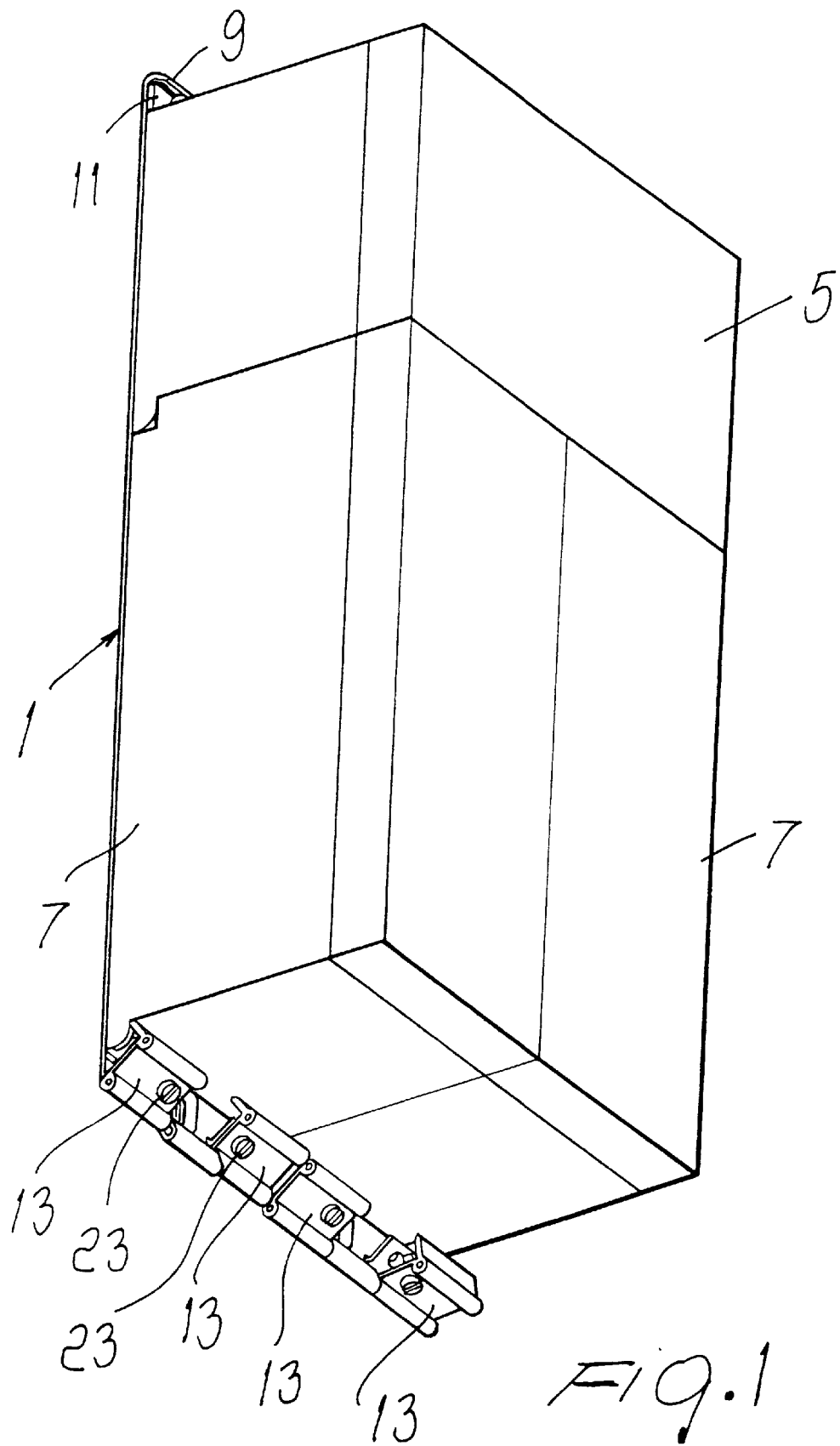
FIG. 1 is a schematic perspective view of two service/distribution boxes associated with a plate by means of the system according to the invention.
Figure 2:
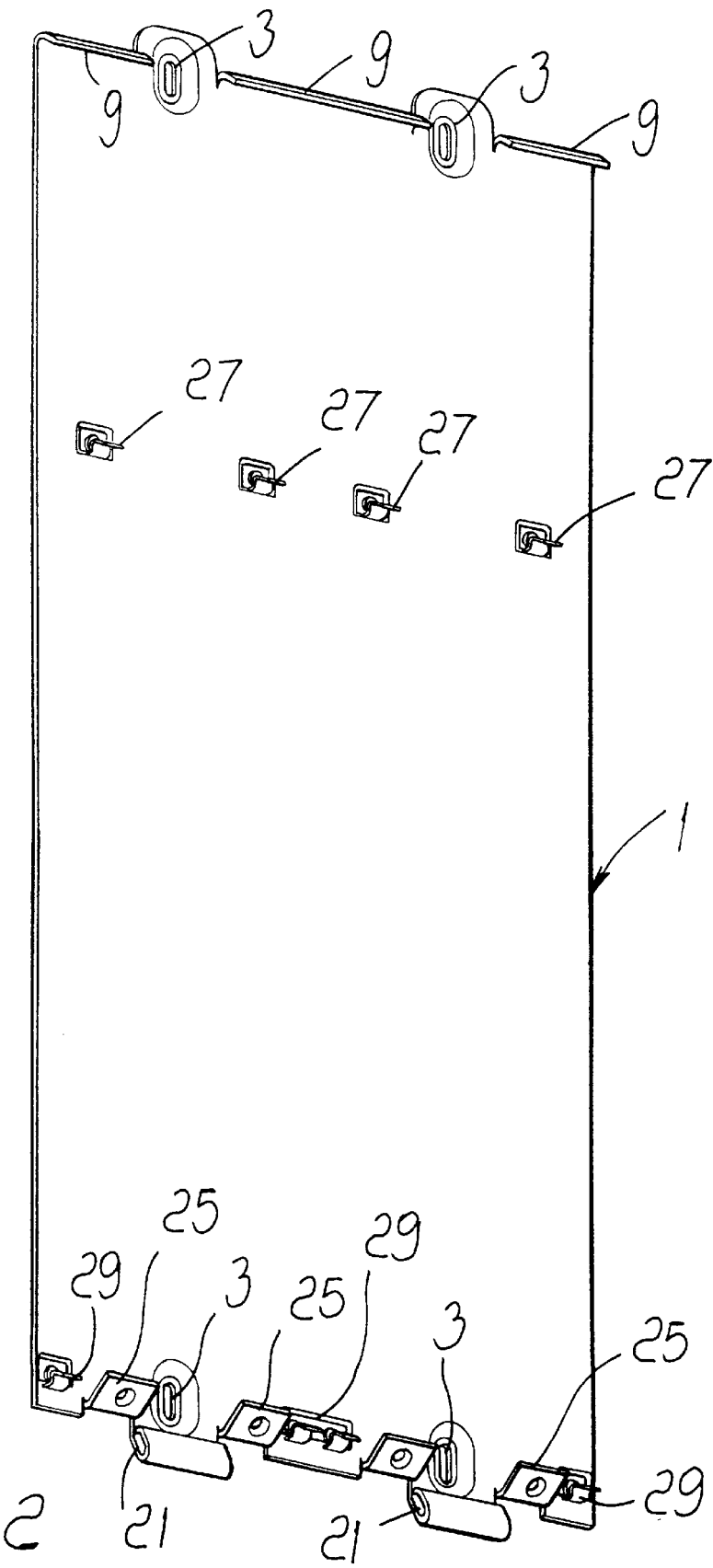
FIG. 2 is a view, similar to FIG. 1, of the base plate alone.
Figure 3:
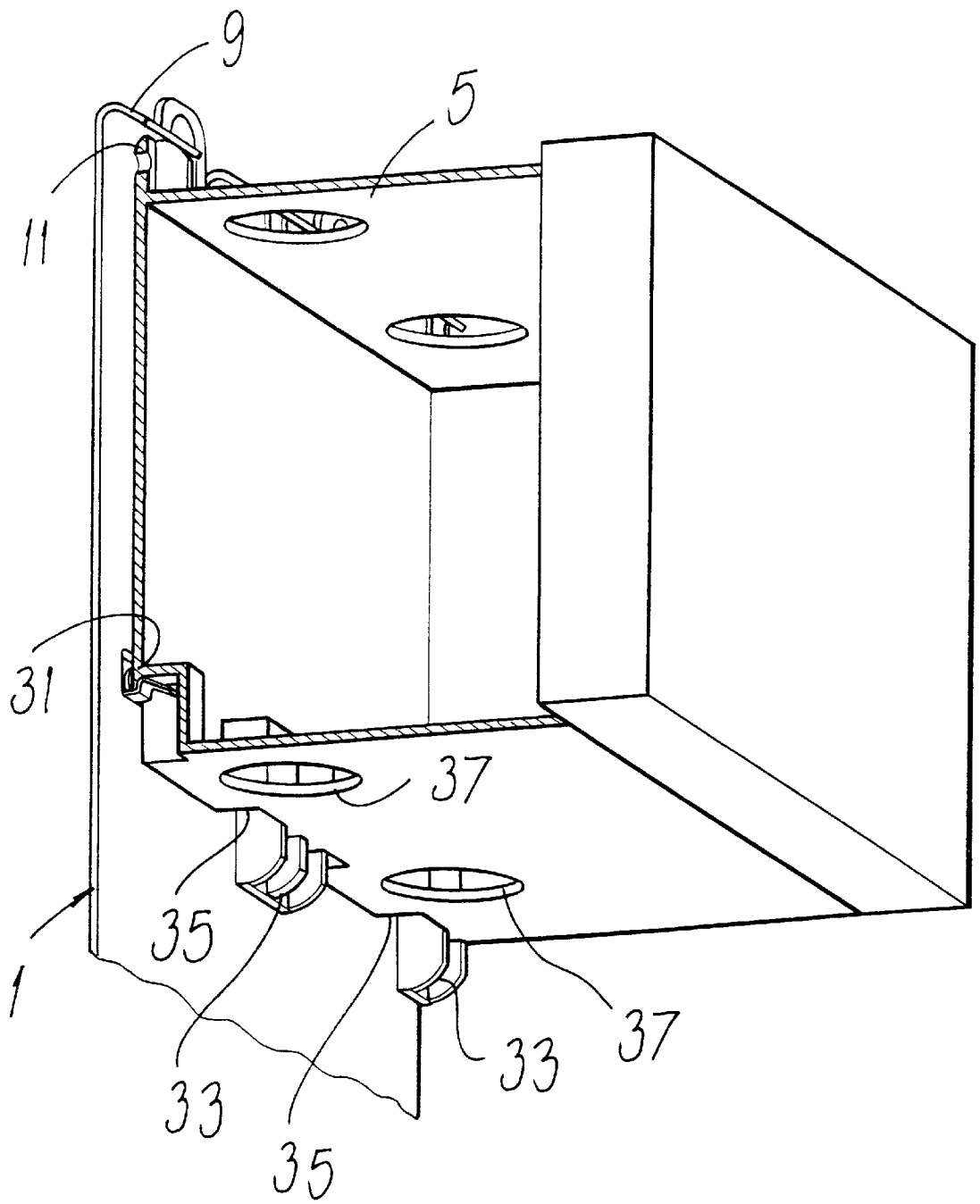
FIG. 3 is an enlarged-scale perspective view of a body for containing an electrical device associated with the plate by means of the system according to the invention.
Figure 4:
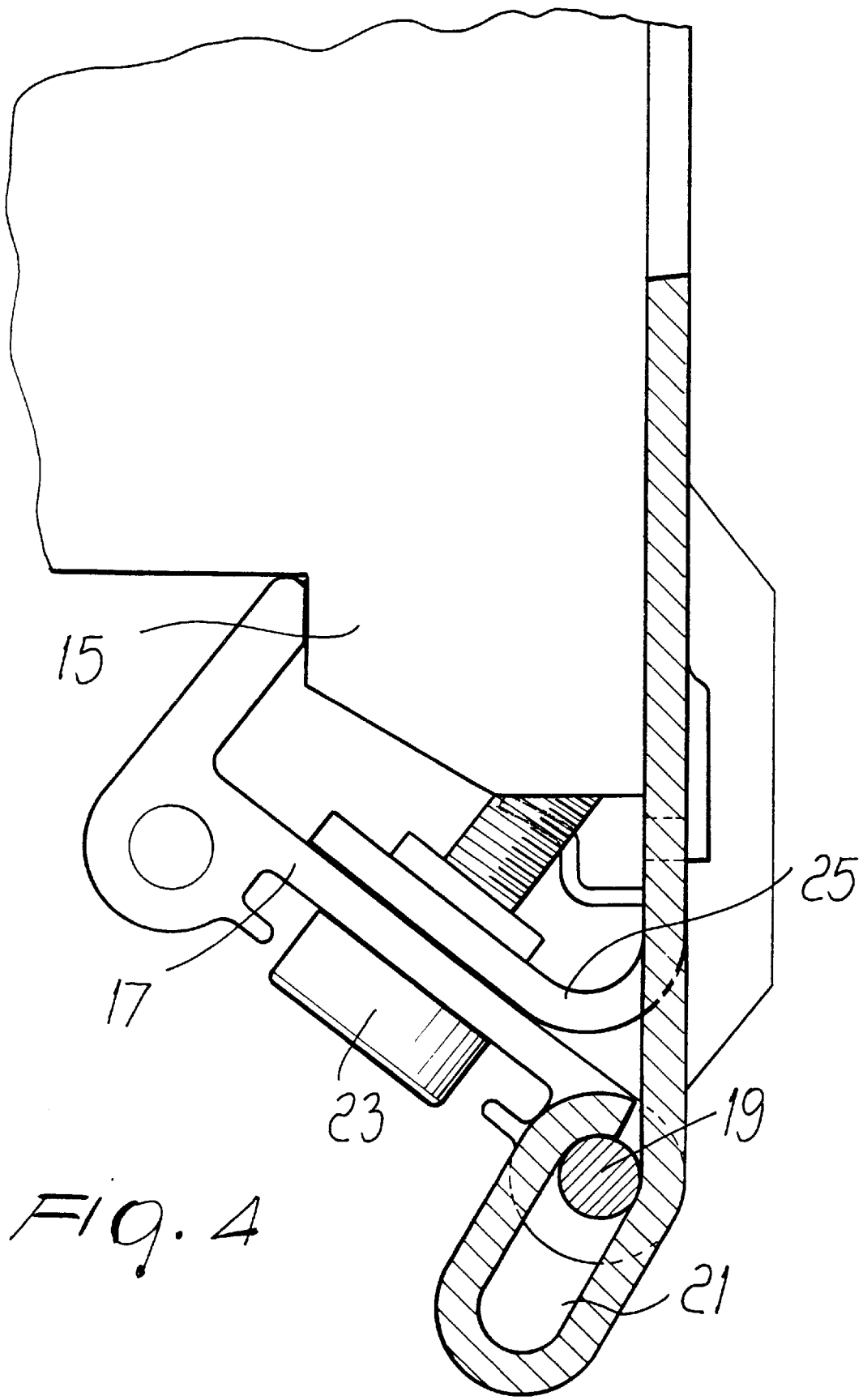
FIG. 4 is an enlarged-scale partial sectional transverse view of the stable engagement means of the system according to the invention.

With reference to the above figures, the modular quick-fit system for electrical devices according to the invention comprises a base plate 1 provided with a fastening means, for example holes 3, for anchoring the plate to a wall or to any another supporting member, in a per se known manner.

The base plate 1 is adapted to support one or more electrical devices, such as service/distribution boxes, etc, which are shown schematically in the figures as an upper casing or box 5 and two lower casings or boxes 7.

The plate 1 includes an upper folded flap 9 which is adapted to engage a protruding member 11 which is constituted for example by a plurality of feet and is formed on the box 5 in an upper region and proximate to the side near to the base plate.

Proximate to the lower edge, the plate includes a plurality of hinged members, constituted by retainers 13, which are adapted to engage the lower edge 15 of a lower box 7. In the illustrated example, each retainer 13 is substantially L-shaped and has an axis 19 which engages a hinge seat 21 formed in the base plate 1. The hinge seat 21 is advantageously elongated in order to allow the axis 19 not only to rotate but also to slide.

The retainer 13 also includes a seat for a screw or any another suitable engagement means 23, which abuts in a respective fixed abutment member 25, which is rigidly coupled to the base plate. The fixed abutment member 25 is advantageously constituted by a lower folded flap of the plate and includes a threaded seat for the respective screw 23.

The boxes 5 and 7 can be temporarily associated with the base plate 1 by means of a temporary engagement means, without the aid of tools, in order to facilitate the assembly of the various devices prior to actual stable fixing to the plate.

The temporary engagement means includes a plurality of elastic members, constituted for example by upper spring clips 27 and lower spring clips 29 which are respectively suitable to engage corresponding temporary engagement members 31 in the upper box 5, and temporary engagement members (which are not shown in the drawings but are similar to the temporary engagement members 31) in the lower box.

As an alternative, according to a different embodiment which is not shown in the drawings, the temporary engagement means can also be constituted by conveniently shaped rigid tabs formed monolithically in the plate.

The system according to the invention also includes a means for the mutual engagement of the lower and upper boxes, which are constituted for example by lower feet 33, in the upper box 5, which are adapted to engage corresponding mutual engagement seats in the lower box 7 (not shown in the drawings). Each lower box 7 is in turn provided with upper feet (not shown in the drawings) which are adapted to engage mutual engagement seats 35 formed below the upper box 5.

The upper and lower boxes 5 and 7 have one or more holes 37 for coupling to adapted collars (not shown) provided on the corresponding face of the adjacent box (the drawing illustrates the holes 37 of the upper box and does not show the collars of the upper box).

The operation of the system according to the invention is as follows. The base plate 1 can be fixed to the wall or other support by means of screws or other fastening systems, using for example the appropriately provided holes 3.

The upper box 5 is applied to the plate 1 by inserting the feet 11 below the upper flap 9 and temporarily locking the box on the plate by means of the spring clips 27.

The lower box 7 can then be applied by inserting the feet (not shown) in the seats 35 of the upper box and by temporarily locking the lower boxes to the plate 1 by means of the spring clips 29.

In order to fasten the boxes 7 and 9 permanently to the plate 1, the retainers 13 are used which, when the screws 23 are tightened, push upward the lower box, compressing the gasket interposed between the hole and the bush and compacting the box/outlet assembly in an upward direction.

The figures show, by way of example, an embodiment which is constituted by two lower boxes, for example two outlets, and by an upper box, for example a double box. However, it is evident to those skilled in the art that the system according to the invention can be equally applied to any combination of electrical devices, from individually-fitted ones to cluster-fitted devices.

It is also to be noted that the fixing holes 3 are provided outside the profile of the plate affected by the electrical devices, so as to allow to fit the devices on the plate even before the plate is mounted on the wall, if the installer judges this to be more convenient.

In practice it has been observed that the invention achieves the intended aim and objects, a modular quick-fit system having been provided which makes it extremely easy and quick to install electrical components such as boxes and/or electrical outlets.

The system according to the invention is susceptible of numerous modifications and variations, within the scope of the appended claims. All the details may be replaced with technically equivalent elements.

The materials used, as well as the dimensions, may of course be any according to requirements and to the state of the art.

What is claimed is:

1. A modular quick-fit system for electrical devices, comprising:

a base plate adapted to be fixed to a support surface;

one or more electrical devices each including a casing;

temporary engagement means on said plate and said casing for temporarily mounting said casing to said plate without using tools;

stable engagement means on said plate and said casing for permanently and detachably anchoring said casing to said plate, said plate comprising an upper folded flap adapted to engage a protruding member formed on an upper casing, on an upper region thereof and proximate to a side of said upper casing that lies adjacent to said plate;

said plate having, proximate to a lower edge, a plurality of hinged members engageable with a lower edge of a lower casing.

2. The system according to claim 1, further comprising a means for the mutual engagement of said casings.

3. The system according to claim 2, wherein said means for the mutual engagement of said casings comprises lower feet which are formed on said upper casing and are adapted to engage corresponding mutual engagement seats in said lower casing, each said lower casing being in turn provided with upper feet which are adapted to engage mutual engagement seats formed on a lower side of said upper casing.

4. The system according to claim 3, wherein said casings are each provided with at least one hole for enabling a coupling of the respective casing to a respective collar provided on a corresponding face of an adjacent casing.

5. The system according to claim 1, wherein each one of said hinged members is substantially L-shaped and has an axis or pin which engages a hinge seat formed in said base plate.

6. The system according to claim 5, wherein said hinge seat is elongated in order to allow a sliding of said axis or pin of said hinged member in addition to a rotation thereof.

7. The system according to claim 6, wherein said hinged member comprises a seat for a screw or for another engagement means which is adapted to abut against a respective fixed abutment member which is rigidly coupled to said base plate.

8. The system according to claim 7, wherein said fixed abutment member is constituted by a folded lower flap of said plate and comprises a threaded seat for the respective screw.

9. The system according to claim 8, wherein said temporary engagement means comprises a plurality of upper and lower elastic members which are respectively adapted to engage corresponding temporary engagement members formed respectively in said upper casing and in said lower casing.

* * * * *